E. LITTLEFIELD.
FLY TRAP.

No. 171,673.

Patented Jan. 4, 1876.

Witnesses
S. W. Piper
L. W. Müller

Elisha Littlefield
by his attorney
R. H. Eddy

UNITED STATES PATENT OFFICE.

ELISHA LITTLEFIELD, OF WELLS, MAINE.

IMPROVEMENT IN FLY-TRAPS.

Specification forming part of Letters Patent No. 171,673, dated January 4, 1876; application filed October 28, 1875.

*To all whom it may concern:*

Be it known that I, ELISHA LITTLEFIELD, of Wells, of the county of York and State of Maine, have invented a new and useful Improvement in Fly or Insect Traps; and do hereby declare the same to be fully described in the following specification and represented in the accompanying drawings, of which—

Figure 1:
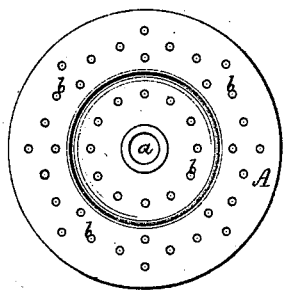
Figure 2:
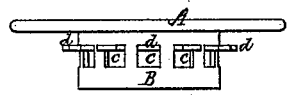
Figure 3:
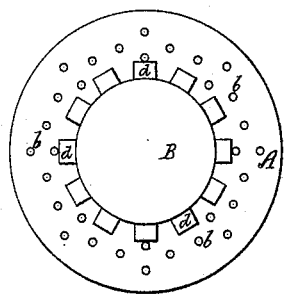
Figure 4:

Figure 1 is a top view, Fig. 2 a side elevation, Fig. 3 an under side view, and Fig. 4 a transverse section, of a trap in accordance with my invention.

This trap, when in use, is to be placed upon the mouth of a tumbler or glass jar, with the cup portion of the trap extending within the said tumbler or jar.

In the drawings, A denotes a disk or plate, having a hole, $a$, through it at or near its center, and, if desirable, sundry other smaller perforations or holes $b$ surrounding said hole. Affixed to the under surface of the said plate or disk is a cylindrical or other proper shaped cup, B, having a series of ports or openings, $c\ c\ c$, through its periphery or sides, and directly over each of the said ports a projection or guard, $d$, to extend from the outer surface of the cup, in manner as shown.

In using this trap molasses or other attractive liquid bait is to be placed in the cup, so as to cover its bottom. The flies, being attracted by the odor of the liquid bait, will alight upon the upper surface of the disk and pass down through the hole $a$ into the cup B, and thence along the bottom of the disk A to one or more of the openings $c$, and thence into the tumbler or jar. Having entered the latter, they will be prevented from escaping or returning into the cup by the guards, for they will not cross the surface of the liquid bait, but in an attempt to escape will pass up against that part of the bottom of the disk which is outside of the cup. From the said part the guards interpose to prevent them from passing back into the ports $c\ c$.

This action of the trap practice with it has fully demonstrated.

This trap I usually construct of sheet metal, or of glass or earthenware, and sometimes have the cup removable from the disk; but this is not necessary, as it is an easy matter to cleanse the trap by putting it under a stream of running water, or pumping water into it.

I do not claim, for being placed in a tumbler or vessel, a cover provided at its center with an opening, and having a projecting flange, as shown in the United States Patents No. 38,277, or No. 126,180.

I claim as my invention—

In a fly-trap, the perforated disk A, provided with the inlet or aperture $a$, and the cup B arranged therewith, and provided with the series of ports $c$ and guard $d$, all being constructed and operating substantially as specified.

ELISHA LITTLEFIELD.

Witnesses:
R. H. EDDY,
J. R. SNOW.